US011248712B2

(12) United States Patent
Murakami et al.

(10) Patent No.: US 11,248,712 B2
(45) Date of Patent: Feb. 15, 2022

(54) ROTARY CONTROL VALVE

(71) Applicant: HITACHI AUTOMOTIVE SYSTEMS, LTD., Hitachinaka (JP)

(72) Inventors: Shingo Murakami, Ebina (JP); Hideaki Nakamura, Yokohama (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/500,779

(22) PCT Filed: Apr. 5, 2018

(86) PCT No.: PCT/JP2018/014508
§ 371 (c)(1),
(2) Date: Oct. 3, 2019

(87) PCT Pub. No.: WO2018/190234
PCT Pub. Date: Oct. 18, 2018

(65) Prior Publication Data
US 2021/0010604 A1 Jan. 14, 2021

(30) Foreign Application Priority Data

Apr. 12, 2017 (JP) .............................. JP2017-078715

(51) Int. Cl.
*F16K 11/085* (2006.01)
*F01P 7/16* (2006.01)

(52) U.S. Cl.
CPC ............ *F16K 11/0856* (2013.01); *F01P 7/16* (2013.01)

(58) Field of Classification Search
CPC ............. F16K 11/0856; F16K 11/0853; F16K 11/085; F16K 5/181; F16K 5/182; F16K 5/0464; F16K 5/0471
See application file for complete search history.

(56) References Cited

U.S. PATENT DOCUMENTS 4,566,482 A * 1/1986 Stunkard ............... F16K 5/0636
137/315.21
4,778,148 A * 10/1988 Kruger ..................... F01L 7/16
123/190.17
(Continued)

FOREIGN PATENT DOCUMENTS

CN 105209807 12/2015
DE 10 2011 083 803 A1 4/2013
(Continued)

OTHER PUBLICATIONS

International Preliminary Report on Patentability issued in corresponding application No. PCT/JP2018/014508 dated Oct. 24, 2019.
(Continued)

*Primary Examiner* — Michael R Reid
(74) *Attorney, Agent, or Firm* — Foley & Lardner LLP

(57) ABSTRACT

A rotary control valve includes: a rotor including a tubular part and an opening in the tubular part; a seal member including a contact face, an internal passage, a noncontact part, and a ridge; a biasing member structured to cause the contact face of the seal member to be pressed on the tubular part; and a drive mechanism structured to rotate the rotor. The contact face is structured to be in sliding contact with the tubular part, and has an arc-curved surface shaped to fit with an outer periphery of the tubular part. The internal passage is structured to communicate with the opening of the tubular part. The noncontact part is formed at least one of ends of the arc-curved surface in a rotational direction of the tubular part, and is structured to be out of contact with the tubular part so as to define the ridge.

19 Claims, 9 Drawing Sheets

(56) References Cited

U.S. PATENT DOCUMENTS

| | | | | |
|---|---|---|---|---|
| 6,290,208 B1* | 9/2001 | Arnett | ................... | B01D 35/12 |
| | | | | 137/625.11 |
| 6,308,739 B1* | 10/2001 | Barbuto | ............... | F16K 5/0478 |
| | | | | 137/625.11 |
| 7,275,606 B1* | 10/2007 | Sims | ...................... | E21B 21/06 |
| | | | | 137/547 |
| 9,897,217 B2* | 2/2018 | Greene | ................ | F16K 11/085 |
| 10,359,138 B2* | 7/2019 | Bareis | .................... | F16J 15/025 |
| 10,865,888 B2* | 12/2020 | Grosskopf | ............. | F16K 5/201 |
| 2017/0321830 A1* | 11/2017 | Bareis | .................... | F16L 21/03 |

FOREIGN PATENT DOCUMENTS

| | | |
|---|---|---|
| JP | S59-063263 U | 4/1984 |
| JP | H06-281075 A | 10/1994 |

OTHER PUBLICATIONS

International Search Report and Written Opinion with English translation issued in corresponding application No. PCT/JP2018/014508 dated Jul. 3, 2018.

Office Action dated Jul. 13, 2020 issued in Chinese Patent Application No. 201880024690.0, with English translation, 18 pages.

\* cited by examiner

ROTARY CONTROL VALVE

TECHNICAL FIELD

The present invention relates to a rotary control valve such as one used in distributing cooling-water for cooling of heat sources of an internal combustion engine, to various heat auxiliary units.

BACKGROUND ART

In a general motor vehicle, a rotary control valve is used in distributing cooling-water to various heat auxiliary units in order to cool an internal combustion engine, for purposes such as: circulating the cooling-water through a radiator in order to radiate heat of the cooling-water; and circulating the cooling water having a high temperature through a warming unit in order to warm an interior of the motor vehicle.

Patent Document 1, DE 102011083803 A1, discloses a rotary control valve for distributing cooling-water to various heat auxiliary units in order to cool an internal combustion engine. The rotary control valve according to Patent Document 1 includes a rotor serving as a valve element with a shape of bottomed cylindrical tube having a closing wall at one end and an open end at another end. The rotary control valve is structured to switch a flow passage due to rotation of the rotor. The rotor is rotatably contained in a housing body of the rotary control valve. The rotary control valve further includes a seal member disposed in a communication passage formed in the housing body, and is configured such that, when an opening of the seal member overlaps with an opening of a peripheral wall of the rotor, the rotary control valve opens and serves to distribute the cooling water that has flowed into the rotor through the open end of the rotor being an inflow port, to the various heat auxiliary units through the opening of the peripheral wall of the rotor and to an internal passage of the seal member.

PRIOR ART DOCUMENT(S)

Patent Document(s)

Patent Document 1: DE 102011083803 A1

SUMMARY OF THE INVENTION

Problem(s) to be Solved by the Invention

The rotary control valve according to Patent Document 1 is structured to control an amount of flow depending on a rotational position of the cylindrical tubular rotor, and is configured to: be open when the opening of the rotor overlaps with the internal passage of the seal member structured to be in sliding contact with an outer periphery of the rotor due to biasing by a compression spring disposed in the communication passage; and be closed when the opening of the rotor is off the seal member in relative position.

The seal member of such rotary control valve includes at its front end a contact face that is structured to contact with the outer periphery of the rotor and has an arc-curved surface for sliding contact with the cylindrical outer periphery of the rotor. However, this rotary control valve is likely to cause a problem that the contact face of the seal member fails to be in suitable sliding contact with the cylindrical outer periphery of the rotor even though the seal member is biased by the compression spring for the sliding contact with the rotor.

In view of the foregoing, it is desirable to provide a rotary control valve in which a contact face at a front end of a seal member is structured to be in suitable sliding contact with an outer periphery of a rotor.

Means for Solving the Problem(s)

According to one aspect of the present invention, a rotary control valve includes: a contact face that is formed at a front end of a seal member, and is structured to be in sliding contact with a cylindrical outer periphery of a rotor, and has an arc-curved surface shaped to fit with the cylindrical outer periphery of the rotor; a noncontact part that is structured to be out of contact with the cylindrical outer periphery of the rotor, and is formed at one of a preceding-side end and a following-side end of the arc-curved surface in a rotational direction of the rotor, so as to form a ridge in the contact face; and a biasing member that is disposed at a face of the seal member opposite to the contact face of the seal member, and is structured to cause the contact face to be pressed on the cylindrical outer periphery of the rotor.

Effect(s) of the Invention

The present invention serves to improve a contact face at a front end of a seal member to have suitable sliding contact with a cylindrical outer periphery of a rotor.

MODE(S) FOR CARRYING OUT THE INVENTION

The following details the embodiments of the present invention with reference to the drawings. The present invention is not limited to the below embodiments, but includes various kinds of modification and application within scope of technical concepts of the present invention.

First Embodiment

The following simply describes configurations of a rotary control valve, previous to detailed description of the embodiments. As mentioned above, the following description shows an example in which cooling-water for an internal combustion engine serves as a heating medium.

Figure 1:
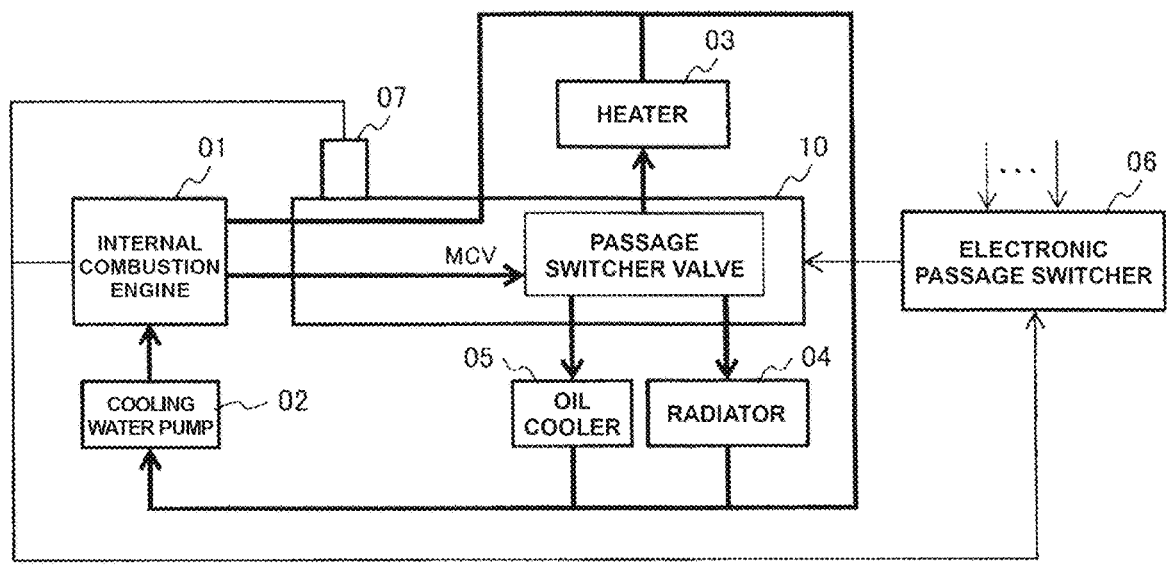
FIG. 1 is a configuration diagram of an exemplary cooling-system for an internal combustion engine employing a rotary control valve according to embodiments of the present invention.

As shown in FIG. 1, internal combustion engine 01 includes a cylinder jacket to which the cooling-water is supplied by a cooling-water pump 02. The cooling-water that has cooled the cylinder jacket is sent to rotary control valve 10. Then, the cooling-water is partially returned to an inlet of cooling-water pump 02 via a thermostat, for regular circulation. The remaining cooling-water is sent to heat auxiliary units including a heater 03, a radiator 04, and an oil cooler 05. These units are only examples, and the heat auxiliary units may include other various units.

The cooling-water is distributed in this wise to the heat auxiliary units under control of an electronic passage switcher 06. Electronic passage switcher 06 is configured to receive various kinds of information such as: information of a water temperature sent from a water temperature sensor 07 provided with rotary control valve 10; information of a running state of internal combustion engine 01; and information of operating states of operation devices in a vehicle interior. Electronic passage switcher 06 serves to perform switching among flow passages toward the respective heat auxiliary units, depending on control signal calculated by electronic passage switcher 06.

Rotary control valve 10 includes an electric motor serving as a drive mechanism, as described below. The electric motor has a rotational position controlled depending on the control signal sent from electronic passage switcher 06. Rotary control valve 10 further includes a rotor fixed to the electric motor, wherein depending on rotation of the rotor, the cooling-water from internal combustion engine 01 is led to flow into communication passages formed in rotary control valve 10 each of which is to be connected to corresponding one of the heat auxiliary units, and is distributed to the respective heat auxiliary units.

Figure 2:
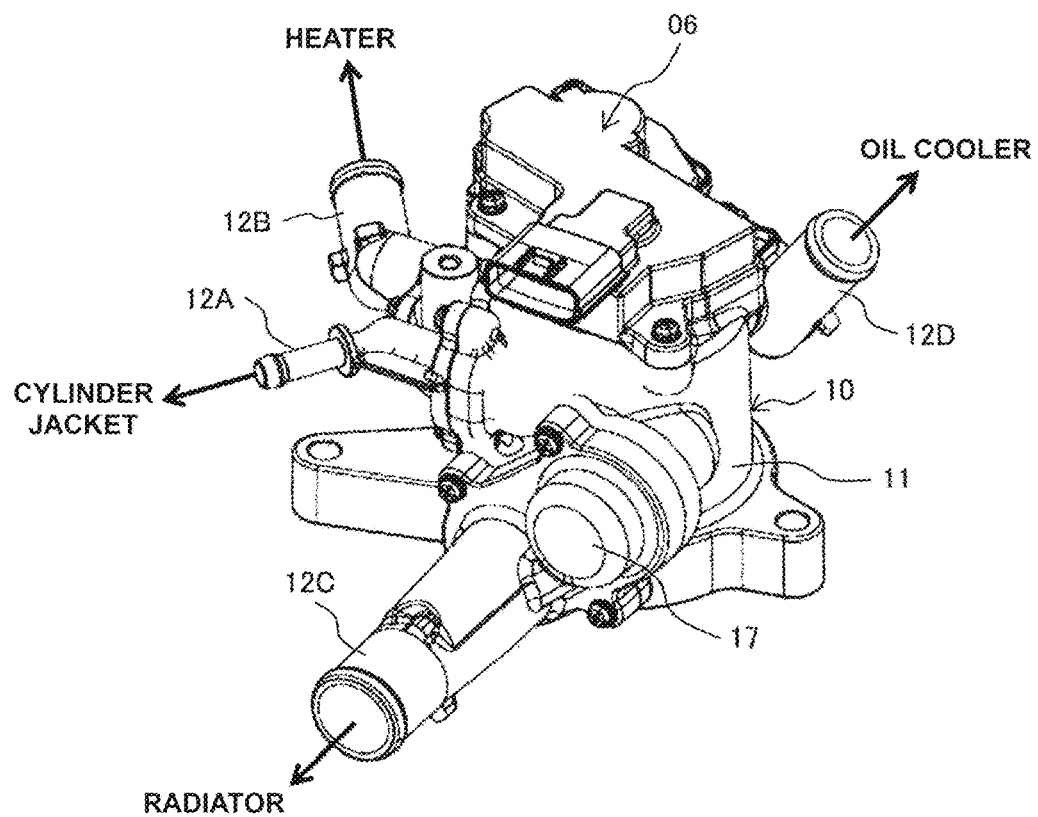
FIG. 2 is a perspective view of a rotary control valve according to the embodiments of the present invention.

FIG. 2 shows an appearance of rotary control valve 10 including a housing 11 to which a connector pipe 12A to be connected with the cylinder jacket, a connector pipe 12B to be connected with heater 03, a connector pipe 12C to be connected with radiator 04, and a connector pipe 12D to be connected with oil cooler 05 are mounted. The cooling-water flows from internal combustion engine 01 into rotary control valve 10, and is distributed to connector pipes 12A, 12B, 12C, and 12D via the rotor contained in housing body 11.

Rotary control valve 10 further includes a cover 17 structured to cover the thermostat in which wax is enclosed. The thermostat serves to control a temperature of the cooling-water flowing in the connector pipe 12A. To a top of housing body 11, electronic passage switcher 06 is mounted for control of the electric motor contained in housing body 11.

Figure 3:
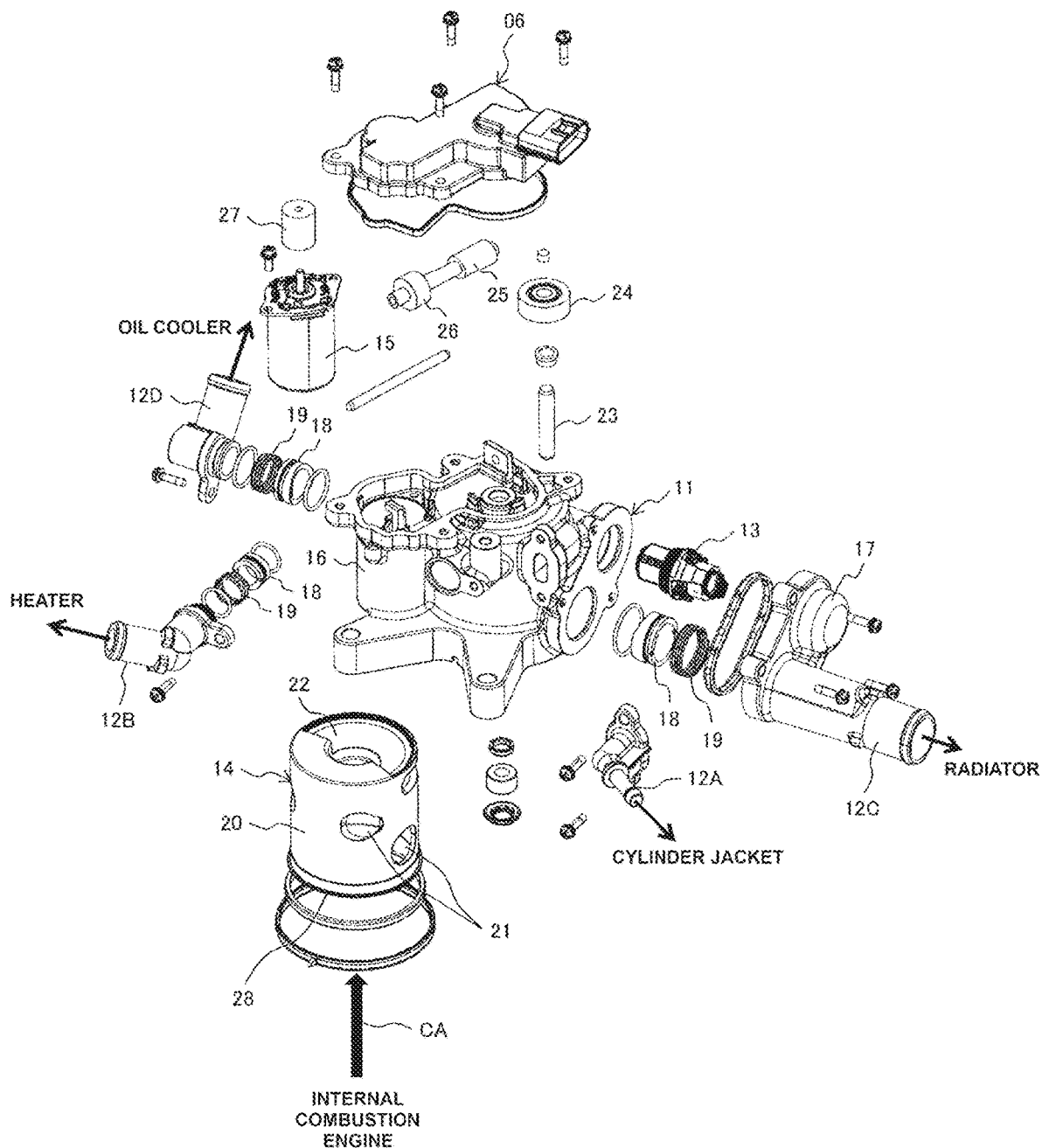
FIG. 3 is a perspective exploded view of the rotary control valve shown in FIG. 2.

FIG. 3 shows a perspective exploded view of rotary control valve 10 shown in FIG. 2. Housing body 11 includes: a valve container 29 (see FIG. 4) structured to contain rotor 14 (a valve body) having a shape of hollow cylindrical tube; and a motor container 16 structured to contain electric motor 15 (the drive mechanism). In addition, electronic passage switcher 06 is fixed to housing body 11 from the outside with fixing bolts in order to form so-called mechanical/electrical integration.

As shown in FIG. 2, connector pipe 12A to be connected with the cylinder jacket, connector pipe 12B to be connected with heater 03, connector pipe 12C to be connected with radiator 04, and connector pipe 12D to be connected with oil cooler 05 are mounted to housing body 11. Connector pipe 12C is formed integrally with cover 17 structured to cover the thermostat 13. Between housing body 11 and each of connector pipes 12A to 12D, a seal member 18 and a compression spring 19 serving as a biasing member are disposed.

In other words, housing body 11 combined with connector pipes 12A to 12D has the communication passages each of which contains seal member 18 and compression spring 19. Seal member 18 has a shape of cylindrical tube having a circular cross section and open ends, and includes a front end face to be pressed on a peripheral wall 20 of rotor 14 due to action of compression spring 19. These configurations are detailed below with reference to FIG. 4.

Rotor 14 has a shape of cylindrical tube with a bottom, and includes a closing wall 22 at one end and an open end 28 at another end. Rotor 14 includes peripheral wall 20 forming a cylindrical tubular part of rotor 14 and having a circular cross section, and includes openings 21 formed in peripheral wall 20. Openings 21 are configured to be selectively connected with connector pipes 12A to 12D in order to let the cooling-water CA flow out to connector pipes 12A to 12D, wherein cooling-water CA flows into an inside of peripheral wall 20 through the open end 28 of rotor 14. Openings 21 of peripheral wall 20 and connector pipes 12A to 12D are configured to be suitably combined to form connection therebetween, depending on which one of the heat auxiliary units is required to be connected.

Rotor 14 is made of synthetic resin. Preferably, rotor 14 is made of a material whose main raw material is polyphenylenesulfide resin (PPS), so as to be sufficient in heat resistance, cold resistance, and chemical resistance and be suitable for a cooling system of internal combustion engine employing coolant. This material can be further improved by mixing it with glass filler (glass fiber) to form a composite material that has higher strength and shape stability and serves to provide more precise valve functions.

Closing wall 22 of rotor 14 is fixed to a rotational shaft 23 such that rotor 14 rotates with rotational shaft 23 in the valve container of housing body 11. Rotor 14 is structured to rotate with closing wall 22 and serve in selection of connection between rotor 14 and connector pipes 12A to 12D (i.e., switching of a flow passage). Rotor 14 is structured to serve also in control of an amount of overlap between opening 21 and seal member 18 depending on a rotational state of rotor 14, and may be used for control of an amount of flow.

Rotor 14 is connected to electric motor 15 via a worm gear mechanism. In detail, rotor 14 is fixed to one end of rotational shaft 23, and another end of rotational shaft 23 is fixed to a worm wheel 24. Worm wheel 24 is structured to engage with a worm shaft via a worm 25 formed at one end of the worm shaft. The worm shaft includes a worm wheel 26 formed at another end of the worm shaft. Worm wheel 26 is structured to engage with a worm 27 fixed to electric motor 15. Accordingly, rotation of electric motor 15 is sequentially transferred to worm 27, worm wheel 26, worm 25, and worm wheel 24, and eventually rotates rotor 14.

In order to cover the electric motor 15 and the worm gear mechanism, a cover for containing electronic passage switcher 06 is fixed on housing body 11. These are configured to work such that the control signal from electronic passage switcher 06 is send to electric motor 15 to make it perform a predetermined rotational action.

Figure 4:
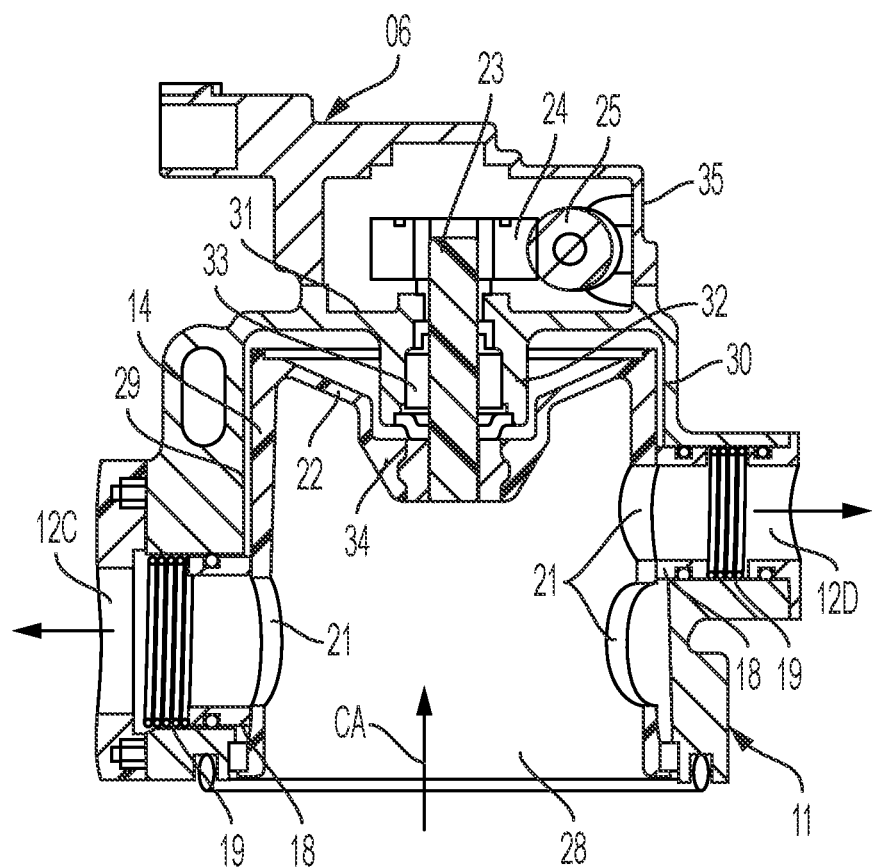
FIG. 4 is a longitudinal sectional view of the rotary control valve shown in FIG. 2, at a longitudinal section along an axis of a rotor.

The following describes relations between rotor 14 and seal member 18 disposed in housing body 11, with reference to FIG. 4. FIG. 4 is a longitudinal sectional view showing a region in which rotor 14 is disposed, at a longitudinal section along an axis of rotor 14.

As shown in FIG. 4, housing body 11 includes valve container 29 appearing circular at a cross section perpendicular to the axis of rotor 14. Valve container 29 includes a side wall 30 having a cylindrical tubular shape, and an end wall 31 closing one end of side wall 30, wherein another end of side wall 30 is open-ended. Valve container 29 is structured to contain rotor 14 such that end wall 31 of valve container 29 faces closing wall 22 of rotor 14.

At a center of end wall 31, a bearing fixing part 32 is formed to extend to an inside of valve container 29 in a direction of the axis of rotor 14. Bearing fixing part 32 contains a slide bearing 33 structured to rotatably support the rotational shaft 23 shown in FIG. 3.

Rotor 14 includes a fixing part 34 formed at a center of closing wall 22. Fixing part 34 extends to an inside of peripheral wall 20 of rotor 14 in the axial direction of rotor 14, and is structured to fix therein the rotational shaft 23 shown in FIG. 3. Accordingly, the rotation of electric motor 15 is decelerated and boosted via the worm gear mechanism including worm wheel 24 and worm 25, and is transferred to rotational shaft 23, and eventually rotates rotor 14. Worm wheel 24 and worm 25 are liquid-tightly covered by cover 35 containing the electronic passage switcher 06.

Figure 5:
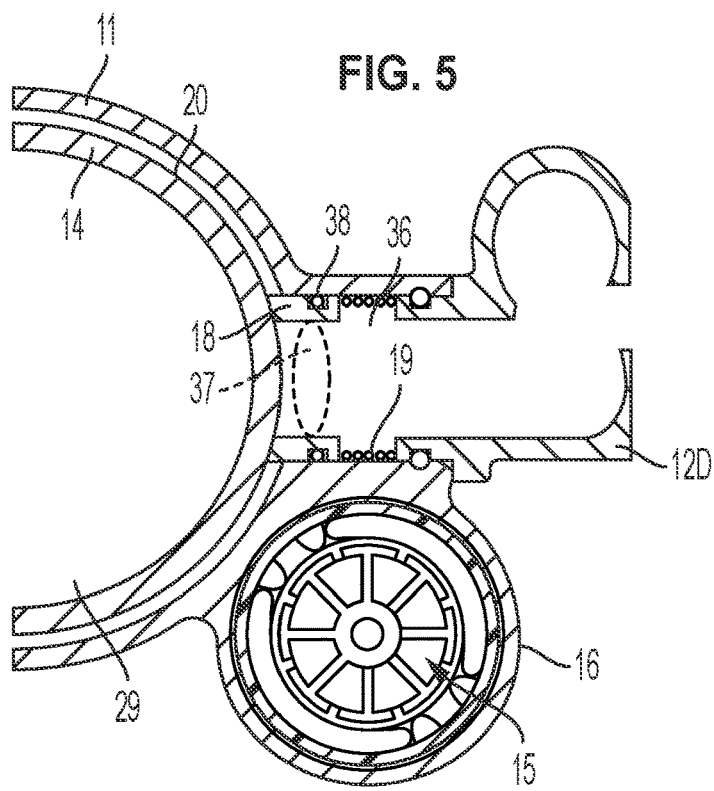
FIG. 5 is a cross sectional view of a communication passage to be connected to an oil cooler of the rotary control valve shown in FIG. 3, at a cross section perpendicular to the axis of the rotor, in a state that the rotor does not communicate with a seal member.
Figure 6:
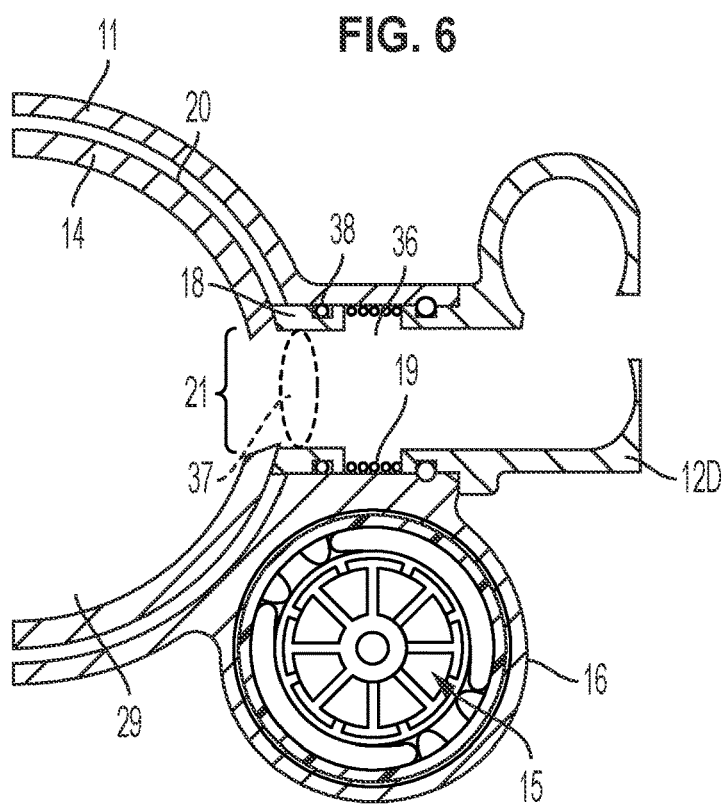
FIG. 6 is a cross sectional view of the communication passage to be connected to the oil cooler of the rotary control valve shown in FIG. 3, at the cross section perpendicular to the axis of the rotor, in a state that the rotor communicates with the seal member.

The following describes configurations involving the communication passage leading to oil cooler 05 of rotary control valve 10, at a cross section perpendicular to the axis of rotor 14, with reference to FIGS. 5 and 6. FIG. 5 shows a state that opening 21 of rotor 14 does not communicate with an internal passage 37 of seal member 18. FIG. 6 shows a state that opening 21 of rotor 14 communicates with internal passage 37 of seal member 18.

In the state of FIG. 5, communication between an inside of rotor 14 and internal passage 37 of seal member 18 is intercepted by peripheral wall 20 of rotor 14, such that the cooling-water cannot flow from the inside of rotor 14 into connector pipe 12D. In contrast, in the state of FIG. 6, the communication between the inside of rotor 14 and internal passage 37 of seal member 18 is allowed via opening 21 formed in peripheral wall 20, such that the cooling-water can flow from the inside of rotor 14 into connector pipe 12D.

Housing body 11 includes valve container 29 structured to contain rotor 14 and motor container 16 structured to contain electric motor 15, wherein valve container 29 and motor container 16 are integrally formed in the housing body 11, and adjacent to each other. Rotor 14 is rotatably contained in valve container 29, and is structured to be rotated by rotational shaft 23. Housing body 11 further includes communication passage 36 extending perpendicularly to a tangential line of peripheral wall 20 of rotor 14, wherein connector pipe 12D to be connected with oil cooler 05 is fitted in communication passage 36 and mounted to housing body 11.

Between communication passage 36 and peripheral wall 20 of rotor 14, seal member 18 having a shape of cylindrical tube that opens at both ends is disposed. Seal member 18 is configured to be pressed on peripheral wall 20 by compression spring 19 disposed between seal member 18 and an end of connector pipe 12D fitted in housing body 11, in a side opposite to a front end face of seal member 18 structured to be in sliding contact with peripheral wall 20. When rotor 14 rotates, the front end face of seal member 18 and a surface of peripheral wall 20 are in sliding contact with each other.

Seal member 18 is made of synthetic resin sufficient in smoothness of sliding and stability of shape. In the present embodiments, seal member 18 is made of a material whose main raw material is polytetrafluoroethylene resin (PTFE) being a fluorine-based to resin. This material can be further improved by mixing it with carbon particles or carbon fiber to form a composite material that has higher strength and shape stability and serves to perform more precise valve functions.

Seal member 18 may be made of material other than fluorine-based resin, such as polyphenylenesulfide resin (PPS). Also when PPS resin is employed, the material can be improved by mixing it with glass filler (glass fiber) to form a composite material that has higher strength and shape stability and serves to perform more precise valve functions.

As rotor 14 rotates, openings 21 of peripheral wall 20 of rotor 14 slide on and meet with the front end face of seal member 18, and overlap with internal passage 37 of seal member 18, and connect the inside of rotor 14 to internal passage 37. The cooling-water that has passed through the internal combustion engine flows perpendicularly to a sheet of FIGS. 5 and 6, into the inside of rotor 14 through the open end 28 of rotor 14 at an end of rotor 14 opposite to closing wall 22, and flows out through one of openings 21 of rotor 14, to internal passage 37, communication passage 36, and connector pipe 12D. Other connector pipes 12A, 12B, and 12C are similarly configured.

Thus, rotary control valve 10 is configured to perform the control of the amount of flow (or the switching of the flow passage) depending on a rotational position of the cylindrical tubular rotor 14. Rotary control valve 10 is structured to: open when one of openings 21 of peripheral wall 20 of rotor 14 overlaps with the front end face of seal member 18 being in sliding contact with peripheral wall 20 due to the biasing by compression spring 19; and close when the one of openings 21 gets off the front end face of seal member 18 in relative position.

The front end face of seal member 18 is a face structured to contact with peripheral wall 20 of rotor 14, and has an arc-curved surface for the contact with peripheral wall 20 having the cylindrical tubular shape. In case that seal member 18 fails to be installed such that the front end face of seal member 18 is accurately in close contact with peripheral wall 20, rotary control valve 10 undergoes a problem in ensuring of suitable contact between the front end face of seal member 18 and peripheral wall 20 of rotor 14 even though compression spring 19 is structured to press seal member 18 on peripheral wall 20.

Rotary control valve 10 includes a seal ring 38 (see FIG. 5) disposed between an outer periphery of seal member 18 and communication passage 36. In case that seal member 18 fails to be installed such that seal member 18 is in close contact with peripheral wall 20 in a regular attitude, seal member 18 may fail to be restored to the regular attitude due to a slide resistance of seal ring 38 even though compression spring 19 is structured to press seal member 18 on peripheral wall 20.

For example, in case that seal member 18 is installed in an irregular attitude in which seal member 18 has been rotationally shifted with respect to the regular attitude around an axis of seal member 18, the front end face of seal member 18 faces peripheral wall 20 in an irregular attitude, and opening 21 of peripheral wall 20 fails to meet the internal passage 37 of seal member 18 at a regular timing.

In view of the foregoing, it is desired to provide a rotary control valve structured to allow a front end face of a seal member to be in suitable sliding contact with an outer periphery of a rotor.

Figure 7:
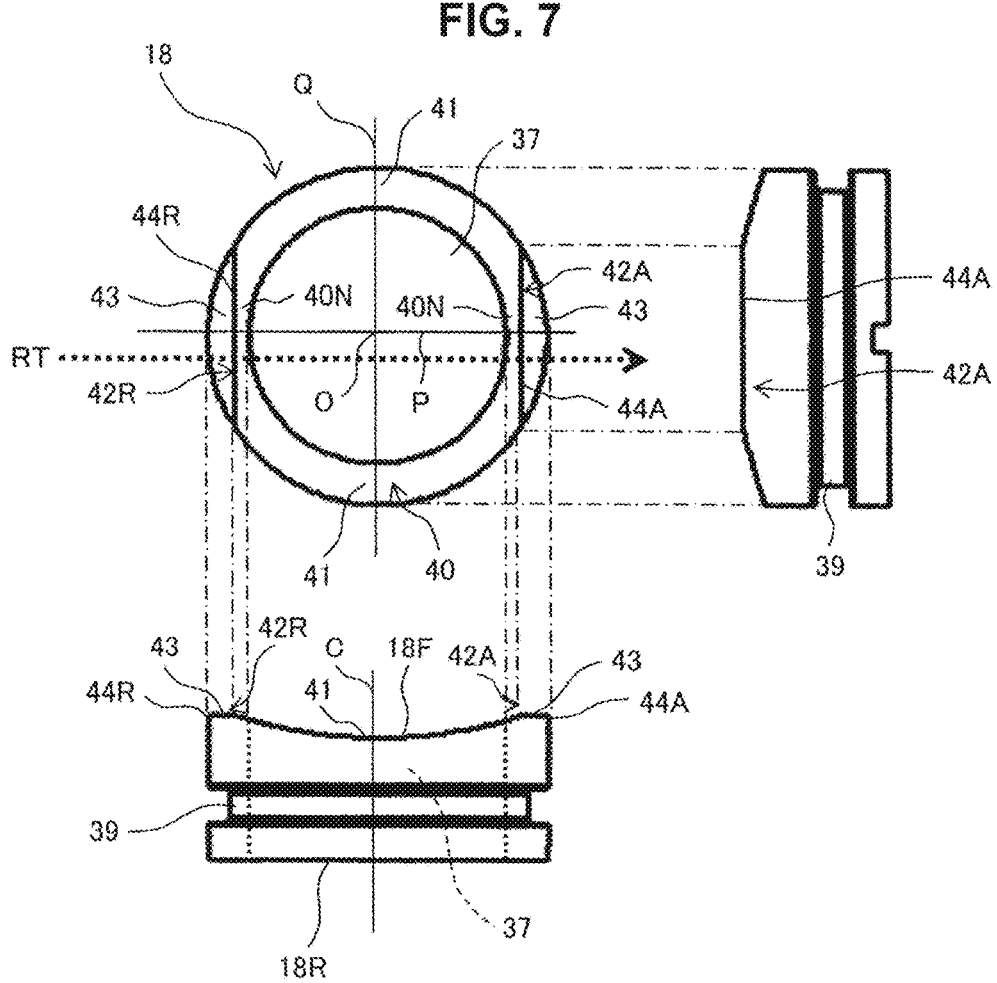
FIG. 7 is a view showing configurations of a seal member according to a first embodiment of the present invention.
Figure 8A:
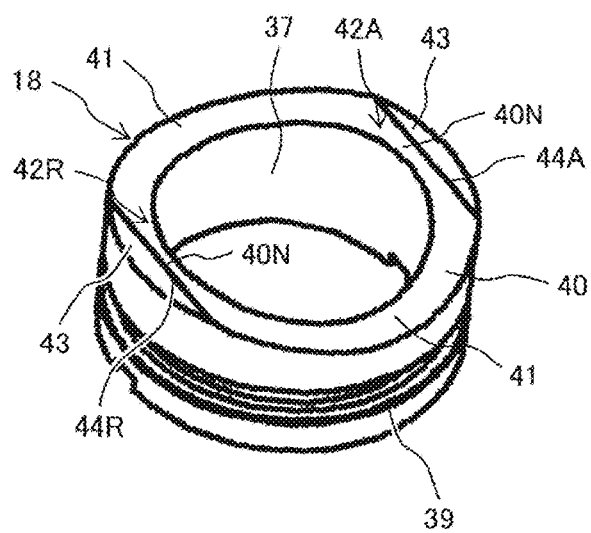
FIG. 8A is a perspective view of the seal member shown in FIG. 7 which shows a front end side of the seal member.
Figure 8B:
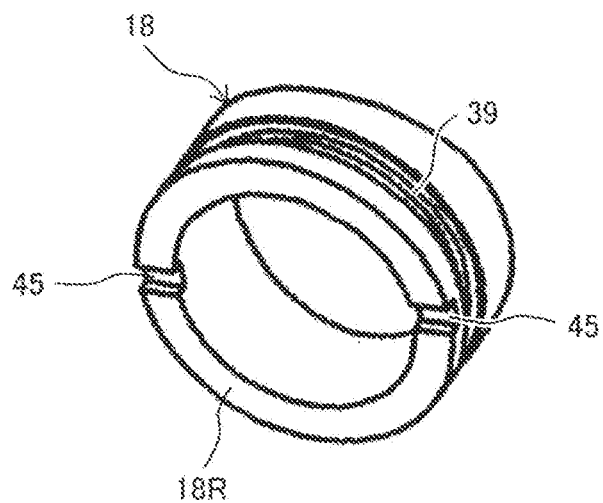
FIG. 8B is a perspective view of the seal member shown in FIG. 7 which shows a rear end side of the seal member.
Figure 9:
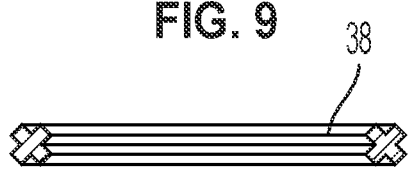
FIG. 9 is a cross sectional view of a seal ring to be mounted to the seal member shown in FIG. 7.

The following describes configurations of the first embodiment of the present invention in detail, with reference to FIGS. 7 to 10. FIG. 7 shows a front view of seal member 18 according to the first embodiment and side views corresponding to the front view. FIG. 8A is a perspective view of seal member 18 which shows a front end side of seal member 18. FIG. 8B is a perspective view of seal member 18 which shows a rear end side of seal member 18. FIG. 9 shows seal ring 38 fitted on the outer periphery of seal member 18.

As shown in FIGS. 7 to 9, seal member 18 has the cylindrical tubular shape, and includes front end face 18F and rear end face 18R, and internally includes internal passage 37 through which the cooling-water flows. Front end face 18F serves as a contact face for sliding contact with peripheral wall 20 of rotor 14, and is accordingly referred to as contact face 18F hereinafter.

Seal member 18 further includes a seal ring container groove 39. Seal ring container groove 39 is formed in the outer periphery of seal member 18 between contact face 18F and rear end face 18R, and is structured to contain seal ring 38. Seal ring 38 has an X-shaped cross section as shown in FIG. 9. This serves to reduce the slide resistance between seal ring 38 and an inner periphery of communication passage 36, and allows seal member 18 to be smoothly restored to the regular attitude as described below.

As shown in FIGS. 7 and 8A, contact face 18F of seal member 18 includes an annular seal area 40 formed outside of internal passage 37, for the sliding contact with peripheral wall 20 of rotor 14 having the cylindrical tubular shape. Annular seal area 40 has an arc-curved surface shaped in conformance with peripheral wall 20, in a view in the axial direction of rotor 14: in other words, in a side view with respect to an axis C of seal member 18. Contact face 18F further includes: depressions 41 nearest to rear end face 18R in contact face 18F; and a preceding-side projection 42A and a following-side projection 42R that are formed at both sides of depressions 41 in a rotational direction of rotor 14, and respectively extend in arc shapes in conformance with peripheral wall 20. Preceding-side projection 42A and following-side projection 42R are greater in length from rear end face 18R than depressions 41. Rear end face 18R has a planar shape perpendicular to axis C of seal member 18.

Each of preceding-side projection 42A and following-side projection 42R is disposed between a pair of depressions 41. Furthermore, preceding-side projection 42A and following-side projection 42R are positioned oppositely to each other. Annular seal area 40 is configured to be in suitable sliding contact with peripheral wall 20 of rotor 14 when seal member 18 is installed in the regular attitude in communication passage 36. Preceding-side projection 42A, depressions 41, and following-side projection 42R in annular seal area 40 are positioned in this order in rotational direction RT of rotor 14.

As shown in FIG. 7, a center 0 is a center of seal member 18 in the axial direction. A line segment P is a line segment passing in rotational direction RT through the center 0, preceding-side projection 42A, and following-side projection 42R. A line segment Q is a line segment passing through the center 0 and perpendicular to line segment P. Seal member 18 includes noncontact parts 43 structured to be out of contact with peripheral wall 20 of rotor 14 and formed at a preceding-side end of preceding-side projection 42A and at a following-side end of following-side projection 42R in rotational direction RT with respect to line segment Q. In other words, in rotational direction RT, noncontact parts 43 are formed at the preceding-side end and the following-side end of the arc-curved surface of contact face 18F.

Each of noncontact parts 43 has a surface flat in rotational direction RT, as formed by cutting off a part of seal member 18 from an outer periphery toward an inner periphery of contact face 18F along a line perpendicular to axis C of seal member 18. The flat surfaces of noncontact parts 43 are accordingly parallel with rear end face 18R of seal member 18.

Preceding-side projection 42A and noncontact part 43 adjacent to it form a ridge 44A. Following-side projection 42R and noncontact part 43 adjacent to it form a ridge 44R. Ridge 44A of preceding-side projection 42A and ridge 44R of following-side projection 42R are linearly formed in a direction perpendicular to rotational direction RT of rotor 14, wherein ridge 44A and ridge 44R are parallel with each other as shown in FIG. 7.

Noncontact parts 43 form areas out of contact with peripheral wall 20 of rotor 14, wherein each of preceding-side projection 42A and following-side projection 42R is adjacent to one of noncontact parts 43.

Accordingly, peripheral wall 20 is configured to contact only with the arc-curved surface continuing from preceding-side projection 42A to depressions 41 and following-side projection 42R in rotational direction RT.

As described above, noncontact parts 43 are disposed in a preceding side of preceding-side projection 42A and in a following side of following-side projection 42R in rotational direction RT, as formed by cut-off in the direction of line segment Q parallel to the axis of rotor 14. Noncontact parts 43 accordingly extend in the axial direction of rotor 14.

As shown in FIG. 7, contact face 18F further includes narrow seal areas 40N formed between preceding-side projection 42A and internal passage 37 and between following-side projection 42R and internal passage 37. Ridge 44A is linearly formed by cutting the preceding-side end of preceding-side projection 42A in the direction of line segment Q in order to form the noncontact part 43. Similarly, ridge 44R is linearly formed by cutting the following-side end of following-side projection 42R in the direction of line segment Q in order to form the noncontact part 43.

Ridge 44A of preceding-side projection 42A and ridge 44R of following-side projection 42R are parallel with line segment Q, and are parallel with each other. Furthermore, ridges 44A and 44R extend perpendicularly to rotational direction RT of rotor 14. Incidentally, the cut-off to form noncontact parts 43 described above may be implemented by machining with a cutter, or other methods such as forming noncontact parts 43 beforehand with metal mold etc., provided that noncontact parts 43 are formed.

Forming ridges 44A and 44R is one of features of the first embodiment of the present invention. This allows that, in case that seal member 18 is installed in the irregular attitude and fails to be in close contact with peripheral wall 20 of rotor 14, seal member 18 is automatically restored to the regular attitude due to compression spring 19 structured to press the seal member 18 on peripheral wall 20. According to the first embodiment, ridges 44A and 44R serve as restoring-function parts of seal member 18, wherein ridges 44A and 44R are formed by noncontact parts 43, preceding-side projection 42A, and following-side projection 42R. The following describes reason why ridges 44A and 44R serve as the restoring-function parts, with reference to FIG. 10.

According to the first embodiment, preceding-side projection 42A and following-side projection 42R of annular seal area 40 are respectively formed with ridges 44A and 44R. This increases a restoring force serving to automatically restore the seal member 18 to the regular attitude, to approximately double compared to a case that the ridge is formed at only one of preceding-side projection 42A and following-side projection 42R.

Figure 10:
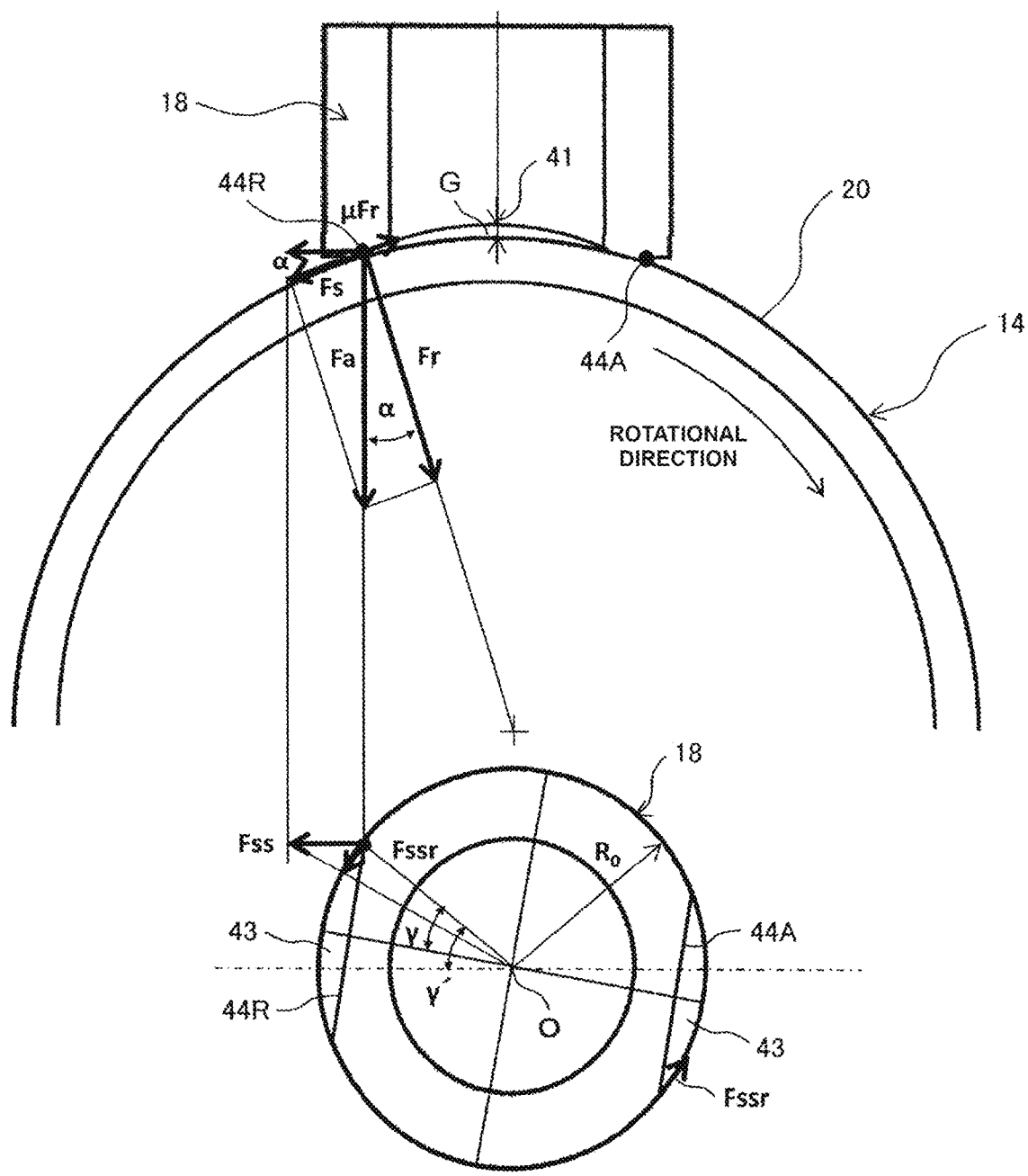
FIG. 10 is an illustrative view for explanation of restoring action of the seal member according to the first embodiment of the present invention.

The following describes a restoring function of ridge 44A of preceding-side projection 42A and ridge 44R of following-side projection 42R, with reference to FIG. 10. FIG. 10 shows a case that seal member 18 is installed in an attitude as rotationally shifted with respect to the regular attitude around center 0 of seal member 18 in the axial direction. This rotational shift yields a gap G in vicinity of peripheral wall 20 of rotor 14 and depressions 41 of seal member 18. Seal member 18 is desired to be restored to the regular attitude in order to eliminate gap G.

FIG. 10 shows: an outer peripheral radius Ro of seal member 18; a compression load Fa due to compression spring 19; a contact angle α of seal member 18 with respect to a peripheral surface of peripheral wall 20; a contact angle γ of a first end of ridge 44R of seal member 18 in the regular attitude, in a radial direction; a contact angle γ' of the first end of ridge 44R of seal member 18 in the rotationally shifted attitude, in the radial direction; and a friction coefficient μ in contact between seal member 18 and peripheral wall 20. Following formula (1) expresses a load Fr in a direction perpendicular to peripheral wall 20.

$$Fr = Fa \times COS\ \alpha \quad (1)$$

Following formula (2) expresses a load Fs in a tangential direction of peripheral wall 20.

$$Fs = Fa \times SIN\ \alpha \quad (2)$$

Following formula (3) expresses a component force Fss due to the load at ridge 44R in the tangential direction.

$$Fss = (Fs - \mu Fr) \times COS\ \alpha \quad (3)$$

Following formula (4) expresses a rotational force Fssr in a rotational direction of seal member 18 at ridge 44R.

$$Fssr = Fss \times SIN\ \gamma' \quad (4)$$

Following formula (5) expresses a rotational torque Ts around the axis of seal member 18.

$$Ts = Ro \times Fssr \quad (5)$$

As seal member 18 rotates anticlockwise in the lower drawing of FIG. 10, ridge 44R moves from the rotationally shifted attitude of angle γ' toward the regular attitude of angle γ. The rotational torque Ts is the restoring force serving to restore the seal member 18 from the rotationally shifted attitude to the regular attitude. The rotational force decreases as seal member 18 approaches the regular attitude of angle γ.

Although ridge 44R has a second end at which a rotational force is generated in a direction opposite to the rotational force Fss, the rotational force at the second end is less than Fss because the second end is less in contact angle in the radial direction than the first end. Seal member 18 is consequently rotated in a direction to approach the regular attitude: i.e., anticlockwise in the lower drawing of FIG. 10. The rotational forces disappear when ridge 44R becomes parallel with the axis of rotor 14. Then, seal member 18 is eventually maintained in the regular attitude.

Seal member 18 is restored in this way to the regular attitude even in case that seal member 18 is installed in a clockwise or anticlockwise rotationally shifted attitude. Also ridge 44A of preceding-side projection 42A is structured to work similarly to ridge 44R.

On the other hand, in a conventional seal member without ridges 44A and 44R, angle γ is zero due to absence of the ridge, and the rotational force Fssr of seal member 18 around its axis is zero, and the rotational torque Ts serving as the restoring force is not generated in seal member 18. Accordingly, in case that seal member 18 is installed in the rotationally shifted attitude around its axis, seal member 18 is likely to be maintained in that attitude. This may cause the problem that opening 21 of peripheral wall 20 fails to meet internal passage 37 of seal member 18 at the regular timing.

According to the first embodiment, contact face 18F configured to be in sliding contact with peripheral wall 20 of rotor 14 has the arc-curved surface shaped in conformance with peripheral wall 20 having the cylindrical tubular shape, and includes at least one of ridges 44A and 44R formed respectively at the preceding-side end and the following-side end of the arc-curved surface in the rotational direction of rotor 14 by noncontact parts 43 out of contact with peripheral wall 20. Ridges 44A and 44R according to the first embodiment are parallel with the axis of rotor 14 in a state that seal member 18 has been restored to the regular attitude.

This configuration allows seal member 18 to be automatically restored to the regular attitude due to action of compression spring 19 pressing the seal member 18 on peripheral wall 20 and the function of ridges 44A and 44R, in case that seal member 18 is installed in the rotationally shifted attitude.

In other words, this configuration is described that: the arc-curved surface for the contact with the cylindrical peripheral wall 20 of rotor 14 is formed at the front end of seal member 18; and the restoring-function parts 44A and 44R are formed at the arc-curved surface in order to restore the seal member 18 to the regular attitude due to the action of compression spring 19 pressing the seal member 18 on peripheral wall 20, in case that seal member 18 is installed in the irregular attitude with respect to peripheral wall 20.

In another words, this configuration is described that: the arc-curved surface for the contact with the cylindrical peripheral wall 20 of rotor 14 is formed at the front end of seal member 18; and a first part and a second part are formed at the arc-curved surface, wherein the first part is structured to rotate the seal member 18 in the irregular attitude toward the regular attitude, and the second part is structured to rotate the seal member 18 in a direction contrary to the first part, due to the action of compression spring 19 pressing the seal member 18 on peripheral wall 20, in case that seal member 18 is installed in the irregular attitude with respect to peripheral wall 20.

This configuration allows contact face 18F of seal member 18 to be in suitable sliding contact with the cylindrical peripheral wall 20 of rotor 14 because contact face 18F is restored to the regular attitude by the restoring force generated in contact face 18F to make it contact closely with peripheral wall 20 due to interaction between peripheral wall 20 and ridges 44A and 44R, wherein each of ridge 44A of preceding-side projection 42A and ridge 44R of following-side projection 42R is adjacent to one of noncontact parts 43 of contact face 18F.

Seal member 18 is slidably disposed in communication passage 36 in sliding contact with the inner periphery of communication passage 36, and thus has a difficulty in restoring the rotational shift in an installation attitude of seal member 18. However, the configurations according to the first embodiment allows the front end of seal member 18 to be in suitable sliding contact with peripheral wall 20 due to the restoring-function parts that are ridges 44A and 44R of contact face 18F formed at the front end of seal member 18, as described above.

Another difficulty in restoring the rotational shift in the installation attitude of seal member 18 may be caused by seal ring 38 having a large slide resistance, while seal ring 38 is disposed between the outer periphery of seal member 18 and the inner periphery of communication passage 36 so as to suppress the cooling-water from leaking through the outer periphery of seal member 18. However, for the reason described above, the configurations according to the first embodiment allows the front end of seal member 18 to be in suitable sliding contact with peripheral wall 20.

Still another difficulty in restoring the rotational shift in the installation attitude of seal member 18 may be caused due to a large slide resistance between seal member 18 and peripheral wall 20 both of which are made of synthetic resin. However, for the reason described above, the configurations according to the first embodiment allows the front end of seal member 18 to be in suitable sliding contact with peripheral wall 20.

As shown in FIGS. 8A and 8B, rear end face 18R of seal member 18 includes a pair of positioning grooves 45 at positions corresponding to noncontact parts 43 in a circumferential direction of seal member 18. Positioning grooves 45 have functions including a function as positioning markers for visual recognition and a function for regulation of the installation attitude of seal member 18.

Positioning grooves 45 serves to indirectly show where noncontact parts 43 are formed, upon installing the seal member 18 in communication passage 36. This allows seal member 18 to be installed roughly regularly for the contact with peripheral wall 20. In case that seal member 18 has been installed in an attitude widely off the regular attitude for the contact with peripheral wall 20 in the rotational direction of seal member 18, positioning grooves 45 facilitates rotating the seal member 18 with a tool toward the regular attitude.

In addition, also housing body 11 including communication passage 36 may include positioning markers corresponding to positioning grooves 45 of seal member 18, in order to show precise installation positions of positioning grooves 45. This allows seal member 18 to be installed more precisely in communication passage 36 by matching the positions of positioning grooves 45 serving as the positioning markers with positions of the positioning markers of housing body 11.

After the installation of seal member 18 in communication passage 36, compression spring 19 is installed, and connector pipe 12D is fitted into housing body 11. Then, the restoring force is generated in contact face 18F to make it contact closely with peripheral wall 20 of rotor 14 due to the interaction between peripheral wall 20 and ridges 44A and 44R, wherein each of ridge 44A of preceding-side projection 42A and ridge 44R of following-side projection 42R is adjacent to one of noncontact parts 43 of contact face 18F. This allows seal member 18 to be automatically restored to the regular attitude in case that seal member 18 is in the rotationally shifted attitude with respect to the regular attitude.

Second Embodiment

The following describes the second embodiment of the present invention. According to the first embodiment described above, noncontact parts 43 are formed in the preceding side of preceding-side projection 42A and the following side of following-side projection 42R in the rotational direction of the rotor. However, as shown in FIGS. 11 and 12, noncontact part 43 may be formed at only one of preceding-side projection 42A and following-side projection 42R.

Figure 11:
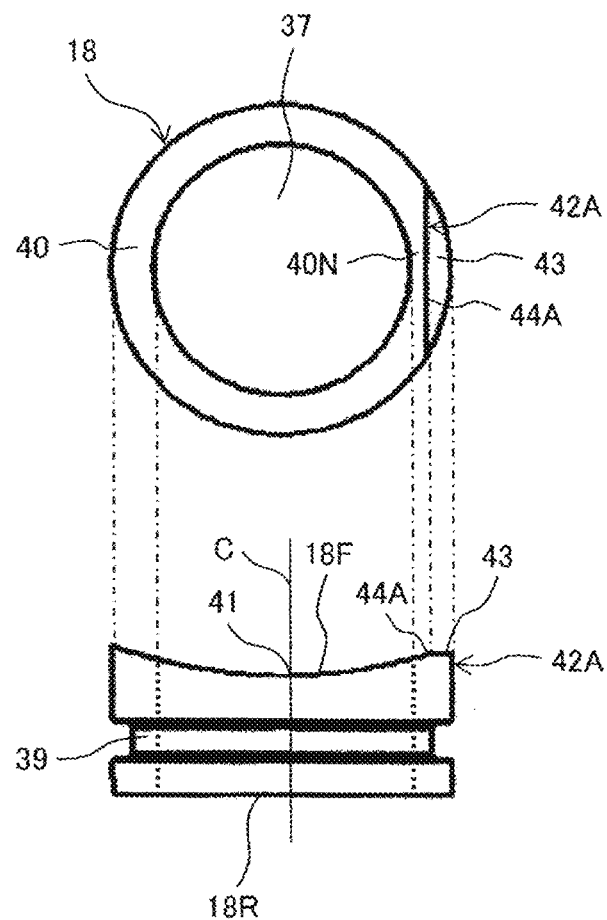
FIG. 11 is a view showing configurations of a seal member according to a second embodiment of the present invention.
Figure 12:
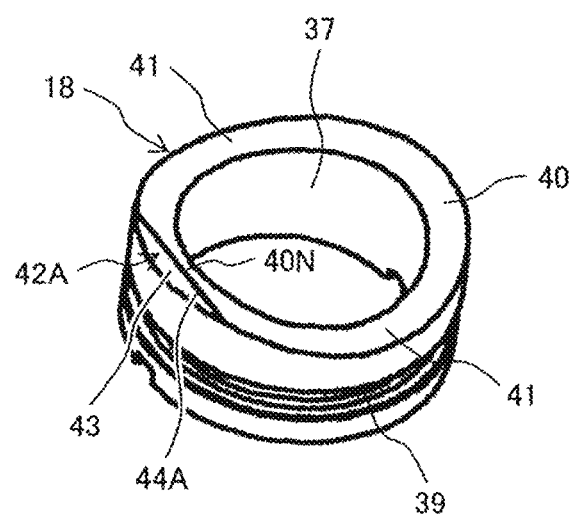
FIG. 12 is a perspective view of the seal member shown in FIG. 11 which shows a front end side of the seal member.

In FIGS. 11 and 12, noncontact part 43 is formed only in the preceding side of preceding-side projection 42A of annular seal area 40, while noncontact part 43 may be formed only in the following side of following-side projection 42R. This configuration can produce beneficial effects similar to that of the first embodiment.

Although each of noncontact parts 43 according to the first and second embodiments is formed flat and perpendicular to axis C of seal member 18, each of noncontact parts 43 may be formed as a continuous slope or a stepped slope wherein the slope is formed to go away from axis C as going from preceding-side projection 42A or following-side projection 42R toward rear end face 18R of seal member 18.

The slope should be configured such that the slope and preceding-side projection 42A or following-side projection 42R form therebetween ridge 44A or 44R that is linear similarly to the embodiment shown in FIGS. 7 to 9 and is disposed at a part at which preceding-side projection 42A or following-side projection 42R meets the slope being the noncontact part. Thus-configured seal member 18 can produce beneficial effects similar to that of the embodiment shown in FIGS. 7 to 9.

Third Embodiment

The following describes the third embodiment of the present invention. According to the first and second embodiments, each of noncontact parts 43 is formed flat and perpendicular to axis C of seal member 18. According to the third embodiment, noncontact parts 43 are replaced with cut-off parts that are formed by cut-off in the direction of axis C and serve as noncontact parts. In the description of the third embodiment, reference numerals same with the first embodiment represent same components with the first embodiment.

Figure 13:
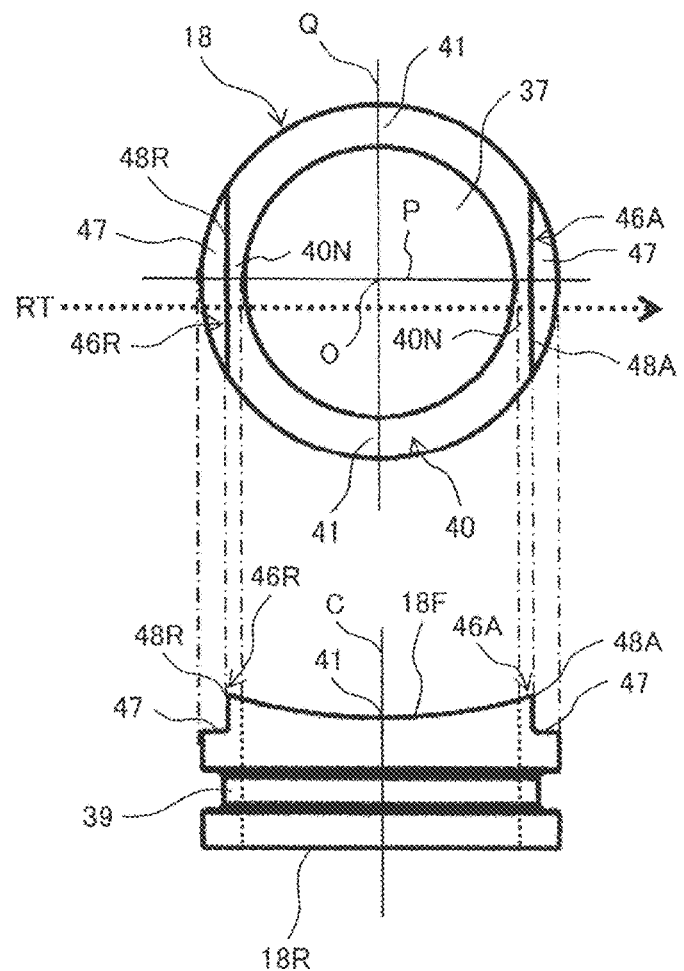
FIG. 13 is a view showing configurations of a seal member according to a third embodiment of the present invention.
Figure 14:
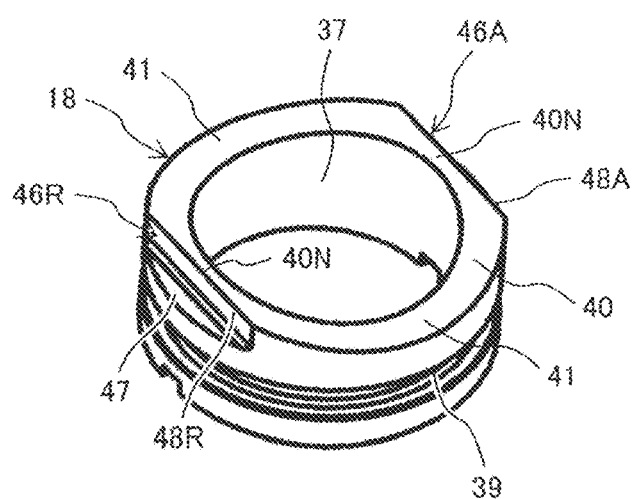
FIG. 14 is a perspective view of the seal member shown in FIG. 13 which shows a front end side of the seal member.

As shown in FIGS. 13 and 14, contact face 18F of seal member 18 includes annular seal area 40 formed outside of internal passage 37 for the sliding contact with the cylindrical peripheral wall 20 of rotor 14. Similarly to the first embodiment, annular seal area 40 has the arc-curved surface shaped in conformance with peripheral wall 20 in the side view with respect to axis C of seal member 18, and includes: depressions 41 nearest to rear end face 18R of seal member 18; and a preceding-side projection 46A and a following-side projection 46R that are formed at both sides of depressions 41 and extend in arc shapes in conformance with peripheral wall 20.

Each of preceding-side projection 46A and following-side projection 46R is disposed between depressions 41. Furthermore, preceding-side projection 46A and following-side projection 46R are positioned oppositely to each other.

Annular seal area 40 is configured to be in suitable sliding contact with peripheral wall 20 of rotor 14, when seal member 18 is installed in the regular attitude in communication passage 36. Preceding-side projection 46A, depressions 41, and following-side projection 46R in annular seal area 40 are positioned in this order in rotational direction RT of rotor 14.

As shown in FIG. 13, seal member 18 includes cut-off parts 47 formed at the preceding-side end of preceding-side projection 46A and the following-side end of following-side projection 46R in rotational direction RT with respect to line segment Q, wherein line segment Q is the line segment passing through the center 0 of seal member 18 and perpendicular to line segment P passing in rotational direction RT through the center 0, preceding-side projection 46A, and following-side projection 46R. Each of cut-off parts 47 has a shape of step as formed by cutting off a part of seal member 18 at a predetermined length in the axial direction of seal member 18, from the preceding-side end or the following-side end of contact face 18F in rotational direction RT toward rear end face 18R.

In other words, each of cut-off parts 47 is formed by cutting a part of synthetic resin body of seal member 18 from preceding-side projection 46A or following-side projection 46R of contact face 18F toward rear end face 18R to a predetermined position, so as to form a ridge similarly to noncontact parts 43 of the first embodiment.

Preceding-side projection 46A and cut-off part 47 adjacent to it form a ridge 48A. Following-side projection 46R and cut-off part 47 adjacent to it form a ridge 48R. Ridge 48A of preceding-side projection 46A and ridge 48R of following-side projection 46R are linearly formed perpendicularly to the rotational direction of rotor 14, wherein ridge 48A and ridge 48R are parallel with each other as shown in the drawings.

Cut-off parts 47 form areas that are out of contact with peripheral wall 20 of rotor 14, similarly to the first embodiment. Each of cut-off parts 47 is adjacent to preceding-side projection 46A or following-side projection 46R. Accordingly, peripheral wall 20 is configured to contact only with the arc-curved surface continuing from preceding-side projection 46A to depressions 41 and following-side projection 46R.

Cut-off parts 47 are disposed at the preceding-side end of preceding-side projection 46A and the following-side end of following-side projection 46R in the rotational direction of rotor 14, and are linearly formed by cut-off in the direction of line segment Q. Line segment Q is parallel with the axis of rotor 14, and cut-off parts 47 are therefore parallel with the axis of rotor 14.

As shown in FIG. 13, contact face 18F includes narrow seal areas 40N formed between preceding-side projection 46A and internal passage 37 and between following-side projection 46R and internal passage 37. Ridge 48A is linearly formed by cutting the preceding-side end of preceding-side projection 46A in the direction of line segment Q in order to form the cut-off part 47. Similarly, ridge 48R is linearly formed by cutting the following-side end of following-side projection 46R in the direction of line segment Q in order to form the cut-off part 47.

Similarly to the first embodiment, ridge 48A of preceding-side projection 46A and ridge 48R of following-side projection 46R are parallel with line segment Q, while ridge 48A and ridge 48R are parallel with each other. Furthermore, ridge 48A and ridge 48R extend perpendicularly to the rotational direction of rotor 14.

According to the third embodiment, ridges 48A and 48R are respectively formed similarly to the first embodiment. This allows seal member 18 to be restored to the regular attitude due to the action of compression spring 19 pressing the seal member 18 on peripheral wall 20 of rotor 14, in case that seal member 18 fails to be installed in the regular attitude in close contact with peripheral wall 20. Ridges 48A and 48R formed by cut-off parts 47, preceding-side projection 46A, and following-side projection 46R serve as the restoring-function parts of seal member 18, for the reason similar to the first embodiment.

According to the third embodiment, the contact face at the front end of seal member 18 structured to be in sliding contact with the outer periphery of the cylindrical tubular part of rotor 14 has the arc-curved surface shaped in conformance with the outer periphery of the cylindrical tubular part. Furthermore, ridges 48A and 48R are formed in the axial direction of rotor 14 by cut-off parts 47 out of contact with the cylindrical peripheral wall 20, at one of the preceding-side end and the following-side end of the arc-curved surface in the rotational direction of rotor 14.

This configuration allows seal member 18 to be automatically restored to the regular attitude due to the action of compression spring 19 pressing the seal member 18 on peripheral wall 20 of rotor 14 and the function of ridges 48A and 48R, in case that seal member 18 is installed in the rotationally shifted attitude with respect to the regular attitude.

In addition, although cut-off parts 47 are formed in the preceding side of preceding-side projection 46A and the following side of following-side projection 46R according to the above description of the third embodiment, cut-off part 47 may be formed in only one of the preceding side of preceding-side projection 46A and the following side of following-side projection 46R as shown in FIGS. 11 and 12.

As seen from the first, second, and third embodiments, noncontact parts 43 or cut-off parts 47 serving as the noncontact parts are formed within an angular range of 90° between a plane perpendicular to axis C of seal member 18 and a plane parallel with axis C, such that ridges 44A and 44R are formed at preceding-side projection 42A and following-side projection 42R, or such that ridges 48A and 48R are formed at preceding-side projection 46A and following-side projection 46R.

Although the first, second, and third embodiments described above are exemplified to employ the cooling-water for the internal combustion engine as fluid to be controlled, the fluid is not limited to such cooling-water and includes various ones.

According to the embodiments of the present invention described hereinabove: a contact face at a front end of a seal member configured to be in sliding contact with a cylindrical outer periphery of a rotor has an arc-curved surface shaped to fit with the cylindrical outer periphery of the rotor; a noncontact part out of contact with the cylindrical outer periphery of the rotor is formed at at least one of a preceding-side end and a following-side end of the arc-curved surface in a rotational direction of the rotor, so as to form a ridge in the contact face of the seal member; and a biasing member structured to cause the contact face of the seal member to be pressed on the cylindrical outer periphery of the rotor.

These configurations allow a front end face of the seal member to be in suitable sliding contact with the cylindrical outer periphery of the rotor.

The present invention is not limited to the above embodiments, but includes various modifications. The above embodiments are described in detail to promote understanding of the present invention, and may be modified to omit some of the features described above. The above embodiments may be modified by: adding some features of one of the embodiments to another one of the embodiments; adding some features to any one of the embodiments; omitting some features of any one of the embodiments; and/or replacing some features of any one of the embodiments with other features.

A rotary control valve according to the above embodiments can be exemplified as follows.

The rotary control valve according to its one aspect includes: a rotor including a tubular part structured to rotate and an opening communicating with an inner peripheral side and an outer peripheral side of the tubular part; a seal member including a contact face, an internal passage, a noncontact part, and a ridge, wherein: the contact face is structured to be in sliding contact with the outer peripheral side of the tubular part, and has an arc-curved surface shaped to fit with the outer peripheral side of the tubular part; the internal passage is structured to communicate with the opening of the tubular part; and the noncontact part is formed at one of a preceding-side end and a following-side end of the arc-curved surface in a rotational direction of the tubular part, and is structured to be out of contact with the outer peripheral side of the tubular part, so as to define the ridge in the contact face; a biasing member disposed at a face of the seal member opposite to the contact face of the seal member, and structured to cause the contact face of the seal member to be pressed on the outer peripheral side of the tubular part; and a drive mechanism structured to rotate the rotor.

According to an exemplary aspect of this rotary control valve, the ridge in the contact face of the seal member has a shape of straight line, and extends in a direction of an axis of the tubular part of the rotor in a state that the seal member is installed in a regular attitude.

According to a further exemplary aspect of the rotary control valve along with any one of the above aspects, the rotary control valve further includes a communication passage structured to allow fluid that has flowed into the communication passage through the opening of the tubular part to flow outside, wherein the seal member is slidably disposed in the communication passage.

According to a further exemplary aspect of the rotary control valve along with any one of the above aspects, the rotary control valve further includes a seal ring disposed between an outer periphery of the seal member and an inner periphery of the communication passage.

According to a further exemplary aspect of the rotary control valve along with any one of the above aspects, the rotary control valve further includes a seal groove formed in the outer periphery of the seal member, wherein the seal groove contains the seal ring.

According to a further exemplary aspect of the rotary control valve along with any one of the above aspects, the seal ring has an X-shaped cross section.

According to a further exemplary aspect of the rotary control valve along with any one of the above aspects, the rotor and the internal passage of the seal member are provided with an internal combustion engine employing cooling-water as fluid flowing in the rotor and the internal passage.

According to a further exemplary aspect of the rotary control valve along with any one of the above aspects, the cooling-water that has been supplied to an inside of the tubular part of the rotor is supplied to the internal passage of the seal member via the opening of the tubular part, due to the rotation of the rotor driven by the drive mechanism.

According to a further exemplary aspect of the rotary control valve along with any one of the above aspects, the ridge of the seal member is formed at each of the preceding-side end and the following-side end of the arc-curved surface of the contact face in the rotational direction of the tubular part of the rotor.

According to a further exemplary aspect of the rotary control valve along with any one of the above aspects, the tubular part of the rotor and the seal member are made of synthetic resin.

According to a further exemplary aspect of the rotary control valve along with any one of the above aspects, the seal member is made of a material whose main raw material is polytetrafluoroethylene resin.

According to a further exemplary aspect of the rotary control valve along with any one of the above aspects, the seal member is made of a composite material in which polytetrafluoroethylene resin is mixed with carbon.

According to a further exemplary aspect of the rotary control valve along with any one of the above aspects, the rotor is made of a material whose main raw material is polyphenylenesulfide resin.

According to a further exemplary aspect of the rotary control valve along with any one of the above aspects, the rotor is made of a composite material in which polyphenylenesulfide resin is mixed with glass fiber.

According to a further exemplary aspect of the rotary control valve along with any one of the above aspects, the seal member further includes a positioning marker at its end opposite to the contact face of the seal member, wherein the positioning marker is formed at a position corresponding to the noncontact part of the seal member in a circumferential direction of the seal member.

According to a further exemplary aspect of the rotary control valve along with any one of the above aspects, the positioning marker is a groove formed at the end of the seal member opposite to the contact face.

According to a further exemplary aspect of the rotary control valve along with any one of the above aspects, the ridge of the seal member is formed at each of the preceding-side end and the following-side end of the arc-curved surface of the contact face in the rotational direction of the tubular part, wherein the grooves are formed at positions corresponding to the ridges, at the end of the seal member opposite to the contact face, wherein the grooves extend in a radial direction of the seal member.

From another point of view about the above embodiments, a rotary control valve according to its one aspect includes: a rotor including a tubular part structured to rotate and an opening communicating with an inner peripheral side and an outer peripheral side of the tubular part; a seal member including a contact face, a rear end face, an internal passage, a cut-off part, and a ridge, wherein: the contact face is structured to be in sliding contact with the outer peripheral side of the tubular part, and has an arc-curved surface shaped to fit with the outer peripheral side of the tubular part; the internal passage is structured to communicate with the opening of the tubular part; and the cut-off part is formed at one of a preceding-side end and a following-side end of the arc-curved surface in a rotational direction of the tubular part, and is structured to be out of contact with the outer peripheral side of the tubular part, so as to define the ridge in the contact face; a biasing member disposed at the rear end face of the seal member opposite to the contact face of the seal member, and structured to cause the contact face of the seal member to be pressed on the outer peripheral side of the tubular part; and a drive mechanism structured to rotate the rotor.

According to an exemplary aspect of this rotary control valve, the cut-off part of the seal member is formed in a shape of step by cutting off a part of the seal member at a predetermined length in a direction of an axis of the seal member, from the preceding-side end or the following-side end of the contact face toward the rear end face.

From still another point of view about the above embodiments, a rotary control valve according to its one aspect includes: a rotor including a tubular part structured to rotate and an opening communicating with an inner peripheral side and an outer peripheral side of the tubular part; a seal member including a contact face, an internal passage, and a restoring-function part, wherein: the contact face is structured to be in sliding contact with the outer peripheral side of the tubular part, and has an arc-curved surface shaped to fit with the outer peripheral side of the tubular part; the internal passage is structured to communicate with the opening of the tubular part; and the restoring-function part is formed in the arc-curved surface, and is structured to restore the contact face to a regular attitude in response to action of pressing the contact face on the outer peripheral side of the tubular part, in case that the seal member fails to be installed such that the contact face is in close contact with the outer peripheral side of the tubular part in the regular attitude; a biasing member disposed at a face of the seal member opposite to the contact face of the seal member, and structured to cause the contact face of the seal member to be pressed on the outer peripheral side of the tubular part; and a drive mechanism structured to rotate the rotor.

The invention claimed is:

1. A rotary control valve comprising:
    a rotor including a tubular part structured to rotate and an opening communicating with an inner peripheral side and an outer peripheral side of the tubular part;
    a seal member including a contact face, an internal passage, a noncontact part, and a ridge, wherein:
        the contact face is structured to be in sliding contact with the outer peripheral side of the tubular part, and has an arc-curved surface shaped to fit with the outer peripheral side of the tubular part;
        the internal passage is structured to communicate with the opening of the tubular part; and
        the noncontact part is formed at one of a preceding-side end and a following-side end of the arc-curved surface in a rotational direction of the tubular part, and is structured to be out of contact with the outer peripheral side of the tubular part, so as to define the ridge in the arc-curved surface of the contact face;
    a biasing member disposed at a face of the seal member opposite to the contact face of the seal member, and structured to press the seal member so as to cause the contact face of the seal member to be pressed on the outer peripheral side of the tubular part; and
    a drive mechanism structured to rotate the rotor, wherein the seal member further includes a groove in an end face of the seal member opposite to the contact face of the seal member;
        the groove is formed at a position corresponding to the ridge of the seal member in a circumferential direction of the seal member, and extends in a radial direction of the seal member; and
        the groove is longer in the radial direction than in the circumferential direction.

2. The rotary control valve according to claim 1, wherein the ridge in the contact face of the seal member has a shape of a straight line, and extends in a direction of an axis of the tubular part of the rotor in a state that the seal member is installed in a regular attitude.

3. The rotary control valve according to claim 1, further comprising:
    a communication passage structured to allow fluid that has flowed into the communication passage through the opening of the tubular part to flow outside, wherein the seal member is slidably disposed in the communication passage.

4. The rotary control valve according to claim 3, further comprising:
    a seal ring disposed between an outer periphery of the seal member and an inner periphery of the communication passage.

5. The rotary control valve according to claim 4, further comprising:
    a seal groove formed in the outer periphery of the seal member, wherein the seal groove contains the seal ring.

6. The rotary control valve according to claim 5, wherein the seal ring has an X-shaped cross section.

7. The rotary control valve according to claim 1, wherein the rotor and the internal passage of the seal member are structured to allow fluid to flow in the rotor and the internal passage, wherein the fluid is cooling water of an internal combustion engine.

8. The rotary control valve according to claim 7, wherein the cooling-water that has been supplied to an inside of the tubular part of the rotor is supplied to the internal passage of the seal member via the opening of the tubular part, due to the rotation of the rotor driven by the drive mechanism.

9. The rotary control valve according to claim 1, wherein the ridge of the seal member is formed at each of the preceding-side end and the following-side end of the arc-curved surface of the contact face in the rotational direction of the tubular part of the rotor.

10. The rotary control valve according to claim 1, wherein the tubular part of the rotor and the seal member are made of synthetic resin.

11. The rotary control valve according to claim 10, wherein the seal member is made of a material whose main raw material is polytetrafluoroethylene resin.

12. The rotary control valve according to claim 11, wherein the seal member is made of a composite material in which polytetrafluoroethylene resin is mixed with carbon.

13. The rotary control valve according to claim 10, wherein the rotor is made of a material whose main raw material is polyphenylenesulfide resin.

14. The rotary control valve according to claim 13, wherein the rotor is made of a composite material in which polyphenylenesulfide resin is mixed with glass fiber.

15. The rotary control valve according to claim 1, wherein:
    the seal member further includes a positioning marker at the end face opposite to the contact face of the seal member, wherein the positioning marker is formed at a position corresponding to the noncontact part of the seal member in a circumferential direction of the seal member; and
    the positioning marker is configured as the groove formed in the end face of the seal member opposite to the contact face.

16. The rotary control valve according to claim 15, wherein:

the ridge of the seal member is formed at each of the preceding-side end and the following-side end of the arc-curved surface of the contact face in the rotational direction of the tubular part; and the seal member includes a pair of the grooves formed at the positions corresponding to the ridges, at the end face of the seal member opposite to the contact face, wherein the grooves extend in the radial direction of the seal member.

17. A rotary control valve comprising:

a rotor including a tubular part structured to rotate and an opening communicating with an inner peripheral side and an outer peripheral side of the tubular part;

a seal member including a contact face, a rear end face, an internal passage, a cut-off part, and a ridge, wherein:
 the contact face is structured to be in sliding contact with the outer peripheral side of the tubular part, and has an arc-curved surface shaped to fit with the outer peripheral side of the tubular part;
 the internal passage is structured to communicate with the opening of the tubular part; and
 the cut-off part is formed at one of a preceding-side end and a following-side end of the arc-curved surface in a rotational direction of the tubular part, and is structured to be out of contact with the outer peripheral side of the tubular part, so as to define the ridge in the arc-curved surface of the contact face;

a biasing member disposed at the rear end face of the seal member opposite to the contact face of the seal member, and structured to press the seal member so as to cause the contact face of the seal member to be pressed on the outer peripheral side of the tubular part; and a drive mechanism structured to rotate the rotor, wherein:
 the seal member further includes a groove in the rear end face of the seal member opposite to the contact face of the seal member;
 the groove is formed at a position corresponding to the ridge of the seal member in a circumferential direction of the seal member, and extends in a radial direction of the seal member; and
 the groove is longer in the radial direction than in the circumferential direction.

18. The rotary control valve according to claim 17, wherein the cut-off part of the seal member is formed in a shape of a step by cutting off a part of the seal member at a predetermined length in a direction of an axis of the seal member, from the preceding-side end or the following-side end of the contact face toward the rear end face.

19. A rotary control valve comprising:

a rotor including a tubular part structured to rotate and an opening communicating with an inner peripheral side and an outer peripheral side of the tubular part;

a seal member including a contact face, an internal passage, and a ridge, wherein:
 the contact face is structured to be in sliding contact with the outer peripheral side of the tubular part, and has an arc-curved surface shaped to fit with the outer peripheral side of the tubular part;
 the internal passage is structured to communicate with the opening of the tubular part; and
 the ridge is formed in the arc-curved surface of the contact face, and is structured to restore the contact face to a regular attitude in response to action of pressing the contact face on the outer peripheral side of the tubular part, in case that the seal member fails to be installed such that the contact face is in close contact with the outer peripheral side of the tubular part in the regular attitude;

a biasing member disposed at a face of the seal member opposite to the contact face of the seal member, and structured to press the seal member so as to cause the contact face of the seal member to be pressed on the outer peripheral side of the tubular part; and a drive mechanism structured to rotate the rotor, wherein
 the seal member further includes a groove in an end face of the seal member opposite to the contact face of the seal member;
 the groove is formed at a position corresponding to the ridge of the seal member in a circumferential direction of the seal member, and extends in a radial direction of the seal member; and
the groove is longer in the radial direction than in the circumferential direction.

* * * * *